United States Patent [19]
Petty

[11] Patent Number: 5,117,372
[45] Date of Patent: May 26, 1992

[54] GRAPHICS-ASSISTED TERMINAL ADMINISTRATION ARRANGEMENT

[75] Inventor: Norman W. Petty, Boulder, Colo.

[73] Assignee: AT&T Bell Laboratories, Murray Hill, N.J.

[21] Appl. No.: 382,863

[22] Filed: Jul. 20, 1989

[51] Int. Cl.$^5$ .............................................. G06F 15/46
[52] U.S. Cl. .................................... 395/161; 395/154
[58] Field of Search ....................... 364/518, 521, 523; 340/721, 723, 706

[56] References Cited

U.S. PATENT DOCUMENTS

| | | | |
|---|---|---|---|
| 4,431,870 | 2/1984 | May et al. | 179/81 C |
| 4,524,244 | 6/1985 | Faggin et al. | 179/2 DP |
| 4,628,434 | 12/1986 | Tashiro et al. | 364/130 |
| 4,628,435 | 12/1986 | Tashiro et al. | 364/130 |
| 4,763,356 | 8/1988 | Day, Jr. et al. | 379/368 |
| 4,914,568 | 4/1990 | Kodosky et al. | 364/900 |

OTHER PUBLICATIONS

AT&T, *PC/PBX Connection,* Package 3 User's Guide (Mar. 1986), pp. D-2 to D-8.
Apple computer, Inc., *Macintosh TM Macintosh II,* manual (1986), pp. 29-78, 83-94, 111-121.
Persoft, Inc. *SmarTerm 220, 240, 400,* product specifications (1986).
W. E. Smith, "Approaches to Large-Scale Industrial Facilities Location and Management," *Proc. 6th Ann. Conf. and Exp.: Computer Graphics '85,* vol. 3, Tech. Sessions, (1985), pp. 611-619.
B. M. Brennan, "Computerized Facilities Planning, Design and Management Options for Today's Offices," *Ind. Eng.,* vol. 17, No. 5 (May 1985), pp. 70-74.
J. Potts, "Graphics—new frontier for facilities management," *Data Management,* vol. 20, No. 10 (Oct. 1982), pp. 30-33, 40.
S. Feiner, "APEX: An Experiment in the Automated Creation of Pictorial Explanations," *IEEE Comput. Graphics & Appl.,* vol. 5, No. 11 (Nov. 1985) pp. 29-37.
Z. Xiang et al., "Graphics Interfaces to a Neurological Diagnosis System" *Proc. 6th Ann. Conf. and Exp.: Computer Graphics '85,* vol. 3, Tech. Sessions, (1985), pp. 215-222.

*Primary Examiner*—Heather R. Herndon
*Attorney, Agent, or Firm*—David Volejnicek

[57] ABSTRACT

Telecommunication terminal administration is facilitated by a graphical user interface which uses an on-screen graphical display of a representation of a terminal including its actuators and a display of a list of telecommunications functions assignable to the actuators, a pointing device such as a mouse to select representations of actuators and functions, and a single assigning, or mapping, operating function "copy from-modify-replace to" to assign selected functions to selected actuators of the terminal whose representation is displayed and to assign terminals to locations, (e.g., extension lines and numbers), as well as to modify values of function attributes. The assignments are preserved for future use in the telecommunications system, so that when an actuator to which a function was assigned is actuated on the terminal whose graphical representation was displayed and which is located at its assigned location, the assigned telecommunications function is performed.

26 Claims, 11 Drawing Sheets

| LINE PICKUP | | | |
|---|---|---|---|
| EXTENSION: | 1234 | | |
| CALL APPEARANCE NO: | 2 | | |
| PRIME LINE? | YES | NO | |
| ACCEPT CALLS? | YES | NO | |
| ABBR/DEL RING TYPE: | AUTO | MAN | |
| RING WHEN TRANSFER: | NONE | NO-RING | RING |
| RING TYPE: | NONE | RING | DELAYED | ABBR |

ASSIGN   ADMIN   SELECT

1234

NORMAL MODE | INSPECT MODE | TIME & DATE | ELAPSED TIME | MESSAGE RETRIEVE | | DELETE | ON/OFF

| 4400 | FORWARD ALL CALLS | SEND ALL CALLS | LEAVE WORD | 4-DIGIT 1235 | ABRVDIAL A |
| 4400 | 1258 | CONSULT | CANCEL LEAVEWRD | 4-DIGIT 1236 | ABRVDIAL A |
| 4400 | 1234 | CALL PICKUP | MANUAL EXCLUDE | 4-DIGIT 1237 | ABRVDIAL A |
| PERSONAL CO | LAST EXT CALLED | CONSULT | ABRVDIAL A | | ABRVDIAL B |
| RINGING TRANSFER | RETURN CALL | | EXEC OVERRIDE | PROGRAM SELECT | ABRVDIAL B |
| CONFER | TRANSFER | DIAL INTERCOM | | PROGRAM SELECT | |
| DROP | HOLD | CONSULT | INSPECT MODE | PROGRAM SELECT | |

1 2 3
4 5 6
7 8 9
* 0 #

| | | SIGNAL | | |
| | | COVERAGE CALLBACK | | |
| | | CONSULT | | |

MESSAGE | RECALL | DISCON | ABRVDIAL A

| LINE PICKUP | | | | | | | |
|---|---|---|---|---|---|---|---|
| EXTENSION: | | | | KEYPAD | ENTER | BACKSPACE | |
| CALL APPEARANCE NO: | | RANGE FROM 1 TO 12 | | | | | |
| PRIME LINE? | YES | NO | | | | | |
| ACCEPT CALLS? | YES | NO | | | | | |
| ABBR/DEL RING TYPE: | AUTO | MAN | | | | | |
| RING WHEN TRANSFER: | NONE | NO-RING | RING | | | | |
| RING TYPE: | NONE | RING | DELAYED | ABBR | | | |

| NORMAL MODE | INSPECT MODE | TIME & DATE | ELAPSED TIME | MESSAGE RETRIEVE | | DELETE | ON/OFF |

| 4400 | FORWARD ALL CALLS | SEND ALL CALLS | LEAVE WORD | 4-DIGIT 1235 | ABRVDIAL A |
| 4400 | 1258 | CONSULT | CANCEL LEAVEWRD | 4-DIGIT 1236 | ABRVDIAL A |
| 4400 | 1234 | CALL PICKUP | MANUAL EXCLUDE | 4-DIGIT 1237 | ABRVDIAL A |
| PERSONAL CO | LAST EXT CALLED | CONSULT | ABRVDIAL A | | ABRVDIAL B |
| RINGING TRANSFER | RETURN CALL | | EXEC OVERRIDE | PROGRAM SELECT | ABRVDIAL B |
| CONFER | TRANSFER | DIAL INTERCOM | | PROGRAM SELECT | |
| DROP | HOLD | CONSULT | INSPECT MODE | PROGRAM SELECT | |
| | | | SIGNAL | | |
| | | | COVERAGE CALLBACK | | |
| | | | CONSULT | | |
| MESSAGE | RECALL | DISCON | ABRVDIAL A | | |

Keypad: 1 2 3 / 4 5 6 / 7 8 9 / * 0 #

GRAPHICS-ASSISTED TERMINAL ADMINISTRATION ARRANGEMENT

TECHNICAL FIELD

This invention relates to the administration of telecommunication systems and particularly to the administration of user terminals of such systems.

BACKGROUND OF THE INVENTION

The administration of a telecommunication system involves providing the system with information that (a) specifies, for each extension, the system port to which the extension is assigned, and (b) describes the class of service, i.e., the type of user terminal and service features, associated with the extension. Included among the latter information is terminal administration information-information correlating, associating, or mapping, features with user terminal actuators (e.g., terminal buttons, keys, lights, buzzers, etc.) so that system control, e.g., a PBX switch, can (a) interpret the user's intent in actuating one of these actuators (e.g., buttons, keys), or (b) actuate the proper actuator (e.g., light, buzzer) to advise the user of a given event. Terminal administration is one of the more onerous, yet most-widely used, system administration tasks. The administration is typically done by a system administrator on an administration console, by means of a complex and cumbersome textual input process. The process is difficult to learn and prone to error. For example, in the case of one known business communication system, the description of administrative procedures takes up two volumes each in excess of 500 pages long, and system administrators often rely on an extensive process of learning by doing and observation to learn the administrative procedures, as opposed to attempting to learn them by deciphering and digesting the two volumes of description.

SUMMARY OF THE INVENTION

This invention is directed to solving these and other disadvantages of the prior art. According to the invention, there is provided a graphical user interface that uses a graphical display of a representation of a terminal, a selector such as a mouse or some other pointing arrangement, and a single assigning, or mapping, operating function (e.g., "copy from-modify-replace to" command) to vastly simplify the terminal administration process, thereby making the process easy to learn and use. The display displays a graphical representation of the terminal that is to be administered, including its actuators, and also displays functions assignable to the actuators. Illustratively, the functions are displayed either as a list of functions or as preassigned function labels of the actuators. The selector, such as a mouse that is manipulating a cursor, is used to select, e.g., point to, individual ones of the displayed functions and actuators. The operating function responds to the selector selecting one of the displayed functions and one of the actuators and assigns the selected function to the selected actuator. Preferably, the operating function responds to the selector selecting either (a) one of the displayed functions or (b) one of the displayed actuators that already has an assigned function, and assigns either the selected function or the function that is assigned to the selected actuator, to a second selected actuator (which is the actuator selected by the selecting means to have the function assigned thereto). The function is thus copied from either the list or the one actuator, and is replaced (assigned) to the second actuator. If the copied function has attributes (e.g., parameters) associated therewith, the attribute values may be modified prior to the function being replaced to the second actuator. Also provided are means that record, or store, the assignment of the function to the second actuator, illustratively in a database used for controlling a telecommunication system that includes the administered terminal, such that the assigned function is performed when the second actuator of the administered terminal is actuated.

Preferably, the entire task of assigning a terminal to a location (e.g., a user, an extension number, or a switch port), and of assigning or reassigning features to terminal actuators, is handled by the single operating command "copy from-modify-replace to". All assignment tasks and attribute value specifications are carried out by means of this command. This greatly simplifies the administration process from the administrator's point of view, because the administrator need learn how to use only the single command, as opposed to a plurality of different commands, such as "delete", "copy", "move", and "add", as well as "modify".

To assign a new feature to an actuator, the feature is copied from an administration menu and then replaced over the desired actuator. To merely remove a feature, a blank is copied from either the administration menu or from a blank actuator and replaced over an actuator that has an assigned feature. To copy a feature from one actuator to another, the feature is copied from the actuator that is assigned the feature, and then the copied feature is replaced over the feature of the actuator to which it is being assigned. To move a feature to an actuator, the feature is copied to the actuator to which it is being assigned, and a blank is copied to the actuator that originally had the moved feature. Following copying of a feature and prior to its replacement, any attributes associated with the feature may be modified as desired.

The same operating command is used to assign terminals to telecommunication lines. It performs all operations required to assign a terminal to a new line, to copy a terminal administration to a new line, to move a terminal administration to another line, or to change the administration on a previously-administered line. The operations are identical to feature assignment, except that entire terminal administrations, not just individual features, are copied and replaced to lines, not to actuators. Once a terminal is copied, features thereof may be changed and assigned as indicated above, and then the terminal may be replaced to either the same line or to a different line. This is in contrast with conventional administration arrangements, which do not allow terminals to be administered as a unit, but rather require each individual actuator of each individual terminal to be administered individually, i.e., separately.

These and other advantages and features of the invention will become apparent from the following description of an illustrative embodiment of the invention considered together with the drawing.

DETAILED DESCRIPTION

Figure 1:
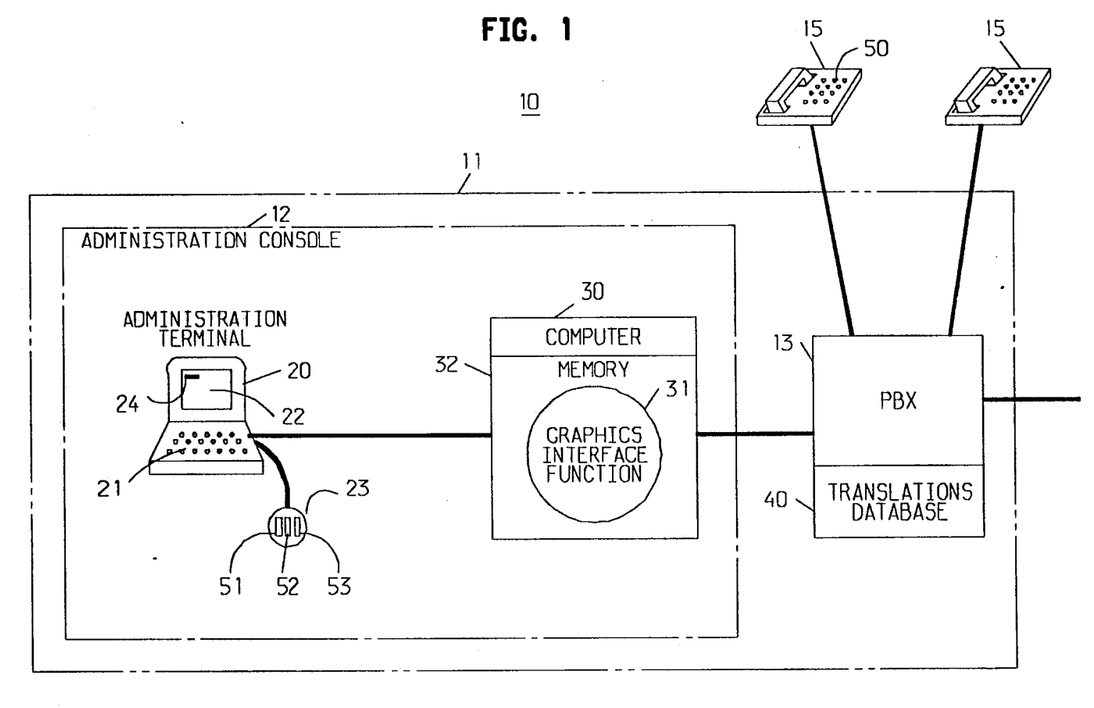
FIG. 1 is a block diagram of the control center of a telecommunications system which includes an illustrative embodiment of the invention.

FIG. 1 shows a telecommunications system such as a private telephone system 10. The system includes a control center 11 comprising a private branch exchange (PBX) switch 13 and an administration console 12 connected thereto. PBX 13 controls and provides communication services to users via a plurality of user terminals 15 connected thereto, under control of information stored in a translations database 40, in a conventional manner. Administration console 12 gives a system administrator control over PBX 13 and enables the administrator to administer—provision and maintain—database 40. Console 12 is, for example, the AT&T Teletype 5620 bit-mapped graphics display terminal. However, as shown in FIG. 1, console 12 may alternatively comprise a discrete computer 30 and a "dumb" administration terminal 20 connected thereto. For ease of discussion, this alternative implementation will be assumed herein.

Administration terminal 20 includes a keyboard 21 and a display, or screen, 22. On display 22 there appears a cursor 24, through the movement of which images are drawn and functions are performed on display 22, all in a conventional manner. Terminal 20 further includes a display-pointing (e.g., cursor-moving) device such as a mouse 23. Mouse 23 includes a plurality of—illustratively 3—programmable function keys 51-53.

In accordance with the invention, administration terminal 20 is a graphics terminal, and a graphics interface function 31 resides in memory 32 of, and executes on, computer 30. Function 31 interacts with a system administrator through administration terminal 20 to facilitate the administration of system 10. In particular, function 31 assists in the assignment of various types of user terminals 15 to particular locations, i.e., to particular users' extension numbers, and further assists in the assignment of functions to programmable actuators 50, such as buttons and indicators, of terminals 15.

The operational features of function 31 are illustrated in FIGS. 2-5. In particular, in response to its invocation at step 200, function 31 displays on display 22 representations of all possible user terminal types that can be selected for use in system 10, at step 201. Function 31 does so by first accessing descriptions, or definitions, of terminal types that are stored within its own database, and then using those descriptions to generate the representations.

Figure 6:
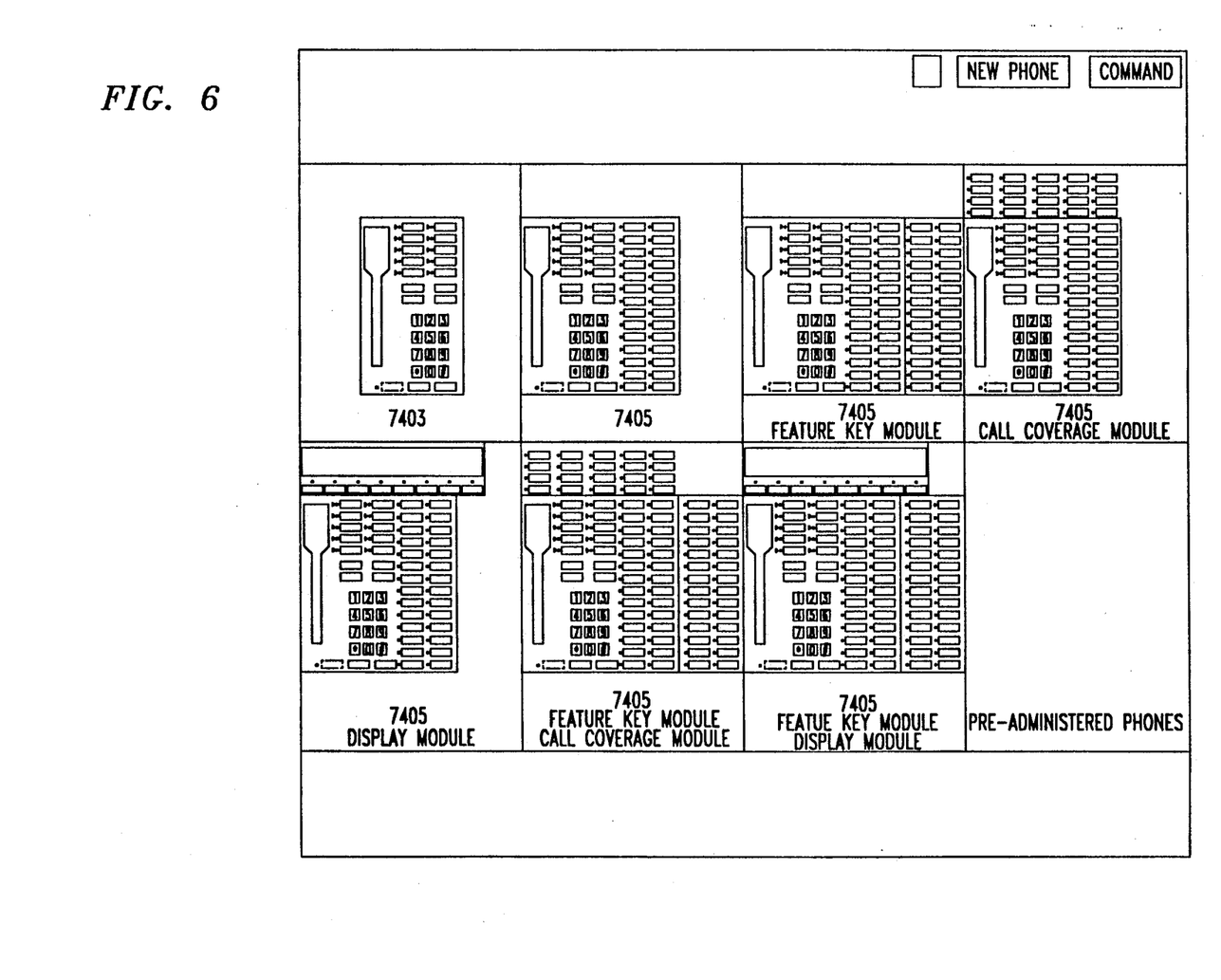
FIGS. 6-11 are illustrative views of the display of the administration console of the system of FIG. 1 during operation of the function of FIGS. 2-5.

An illustrative view of display 22 following step 201 is shown in FIG. 6. It shows representations of a plurality of types of telephone terminals. It will be noted that one of the representations, labeled "Pre-administered Phones" is a blank representation. It represents any one of the other terminal types that may already have been administered previously. Its use allows a pre-administered terminal, including all assigned features thereof, to be copied from one location to another, as will be made clear below. Also, appearing in the upper right hand corner of display 22 are three rectangles, which represent mouse keys 51-53, and whose labels represent the functions presently assigned to those keys 51-53. A blank rectangle represents a disabled, presently-functionless, key.

Figure 2:
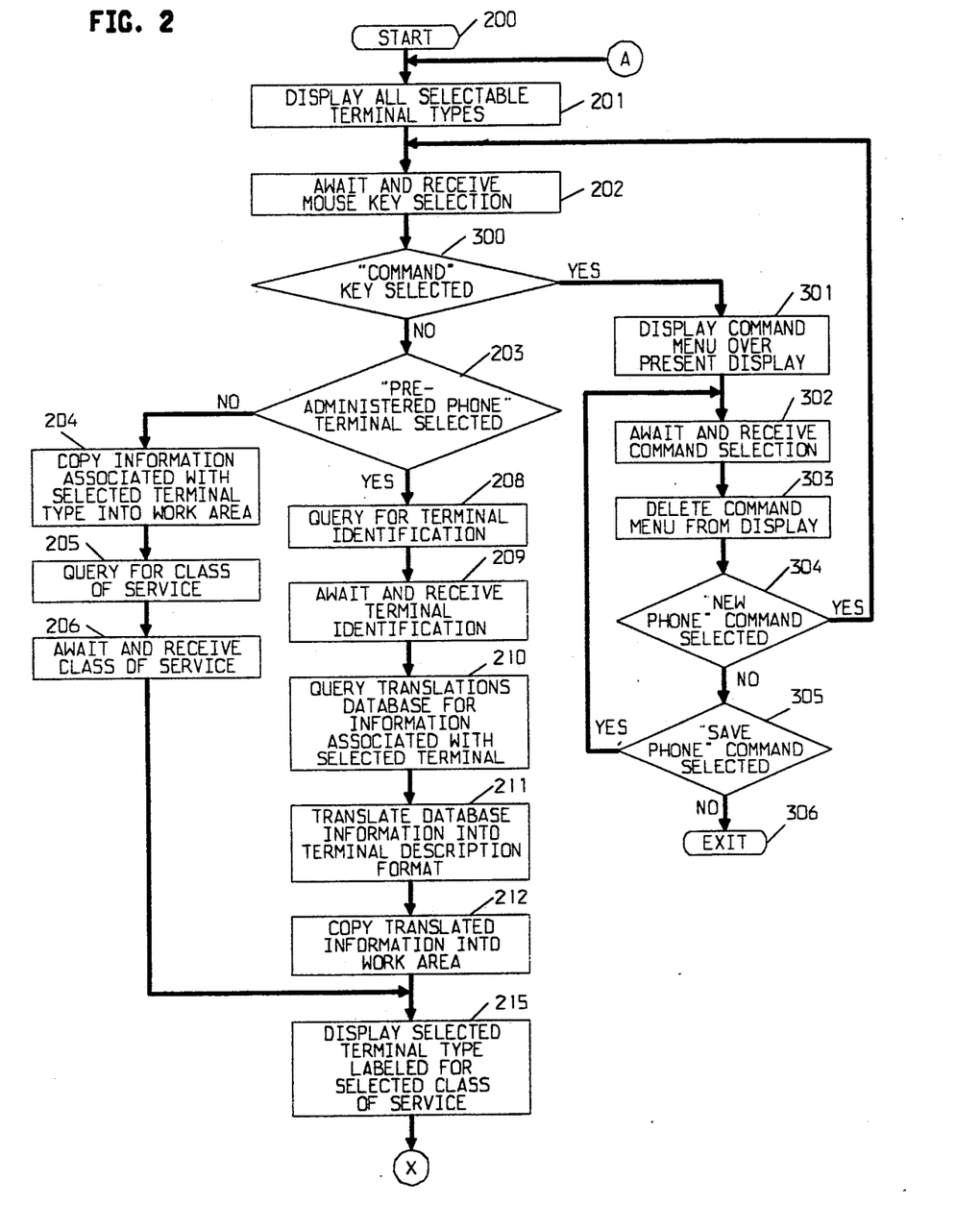
FIGS. 2-5 are a flowchart of the operation of a terminal administration graphics interface function of the console of FIG. 1.

Following step 201, function 31 awaits the administrator's selection of one of the mouse keys 52-53, at step 202. Mouse key 51 is disabled at this time. The administrator selects a command menu by pressing "command" mouse key 53, and selects one of the displayed terminal types by using mouse 23 to position cursor 24 over the representation of the desired terminal type on display 22 and pressing "new phone" mouse key 52.

Figure 3:
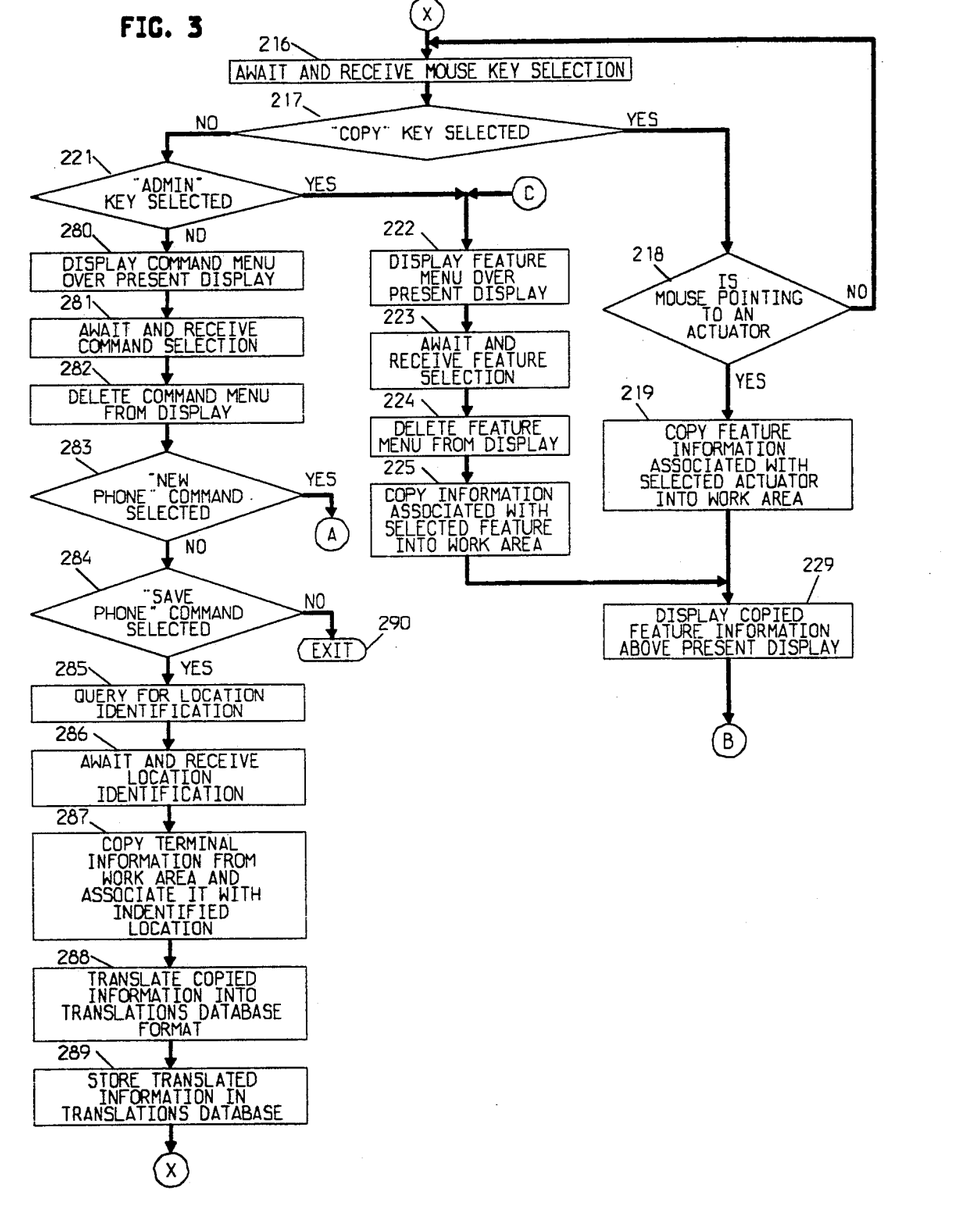
Figure 4:
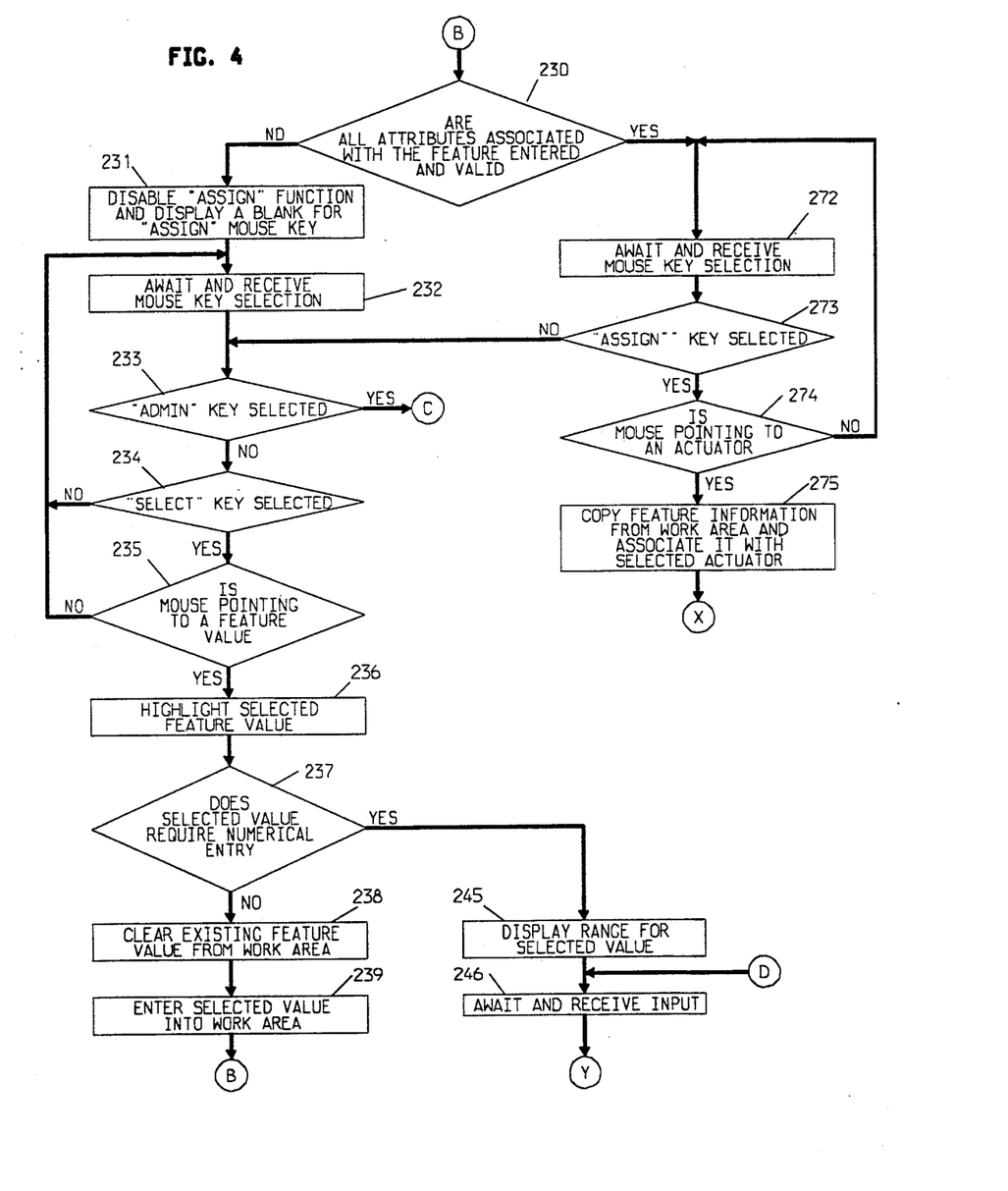
Figure 5:
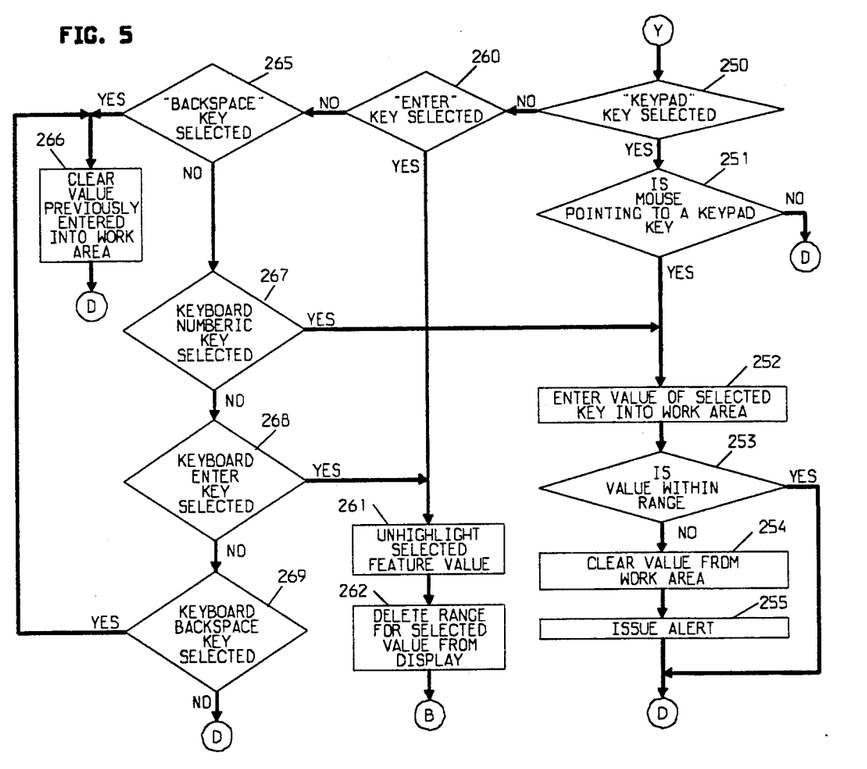
Figure 7:
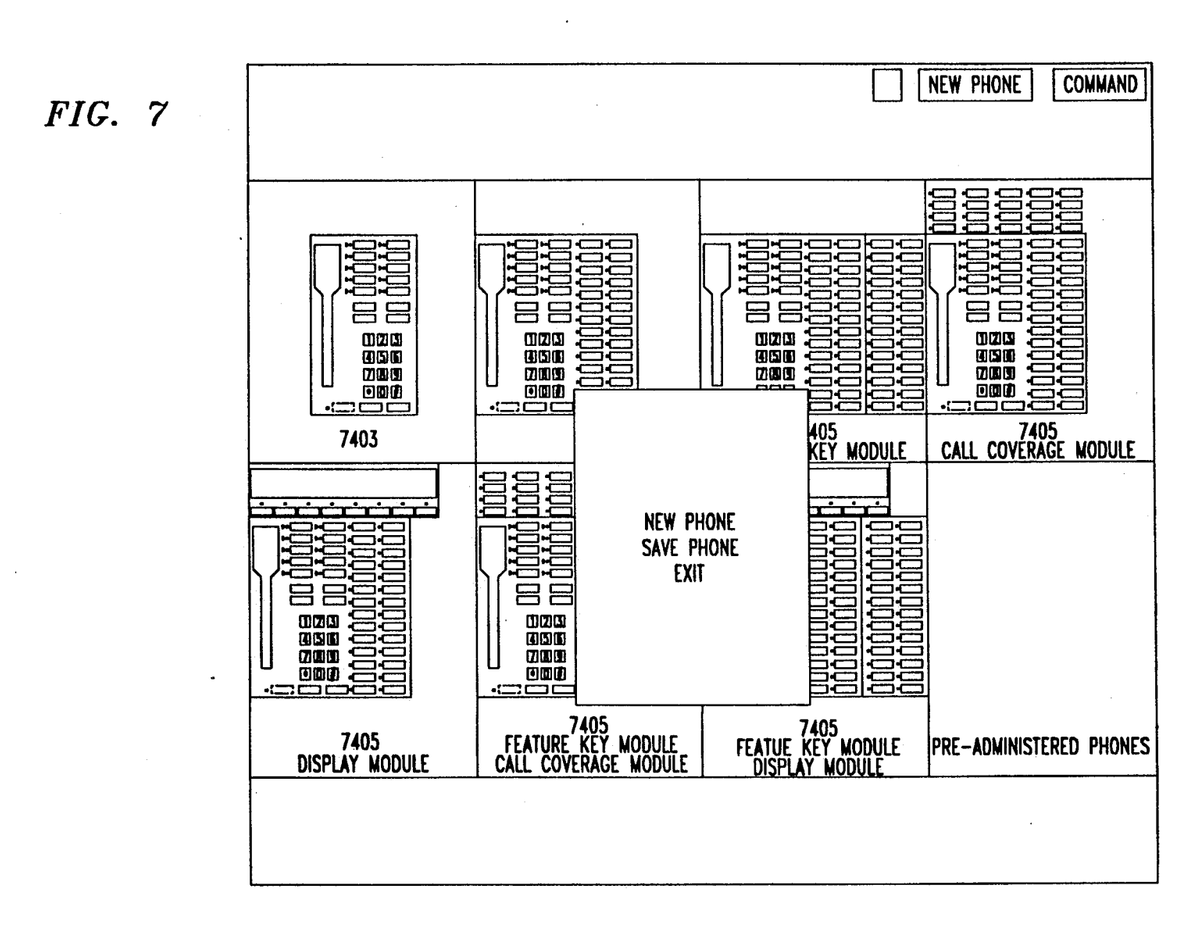

Upon receiving the administrator's selection, at step 202, function 31 determines whether "new phone" key 52 or "command" mouse key 53 was pressed, at step 300. If "command" key 53 was pressed, function 31 displays the command menu over the present display, at step 301. This is shown in FIG. 7. The command menu comprises three choices—"new phone", "save phone", and "exit"—and function 31 awaits the administrator's selection of one of these choices, at step 302. The administrator signals his choice by using mouse 23 to point to the desired command and pressing again "command" mouse key 53. Mouse keys 51 and 52 are not used at this time. Upon receipt of the administrator's input, at step 302, function 31 deletes the command menu from the display, at step 303, determines which command was selected, at steps 304-305, and takes appropriate action. If "new phone" was selected, function 31 returns to step 202 to await a selection from the display of FIG. 6; if "save phone" was selected, function 31 ignores the selection, as there is nothing to save at this time, and returns to await a new selection at step 302; and if "exit" was selected, function 31 exits, in a conventional manner, at step 306.

Returning to step 300, if "new phone" mouse key 52 was pressed, function 31 checks whether the "Pre-administered phones" representation was selected, at step 203. If not, function 31 copies the information that it has about the selected terminal type from its database into a computer 30 memory 32 terminal work area, at step 204. Function 31 then queries the administrator, illustratively through a prompt displayed on display 22, for the class-of-service that the selected terminal is to be assigned, at step 205, and awaits the administrator's response, at step 206. The administrator responds by typing in the appropriate information on keyboard 21. Upon receipt of this input, at step 206, function 31 displays an enlarged representation of only a terminal of the selected terminal type on display 22, at step 215. All non-administrable actuators 50 are displayed in reverse video, and all administrable actuators 50 are blank, i.e., not labeled. An illustrative view of display 22 following step 215 is shown in FIG. 8.

If function 31 determines at step 203 that "Pre-administered phones" were selected, it queries the administrator for the location, i.e., identification, of a particular pre-administered terminal, at step 208, and awaits a response, at step 209. The administrator responds by typing in on keyboard 21 the terminal's location identification. The location identification may be, for example, the name of the user, the extension number, or the PBX 13 port number to which the desired terminal is presently assigned, or any other description that uniquely identifies the desired terminal 15. Upon receipt of the location identification, at step 209, function 31 uses the identification to identify the desired terminal 15 and to query translations database 40 for information about that terminal, at step 210. Function 31 translates this information into the same format in which it stores information about terminals in its own database, at step 211, and copies the translated information into the previously-mentioned computer 30 memory 32 terminal work area, at step 212. Function 31 then uses this information to generate a representation of the selected terminal on display 22, at step 215. In addition to what is shown in FIG. 8, this representation of the selected terminal will have all administrable actuators 50 labeled according to the functions assigned to them as specified by the information obtained from translations database 40.

Figure 8:
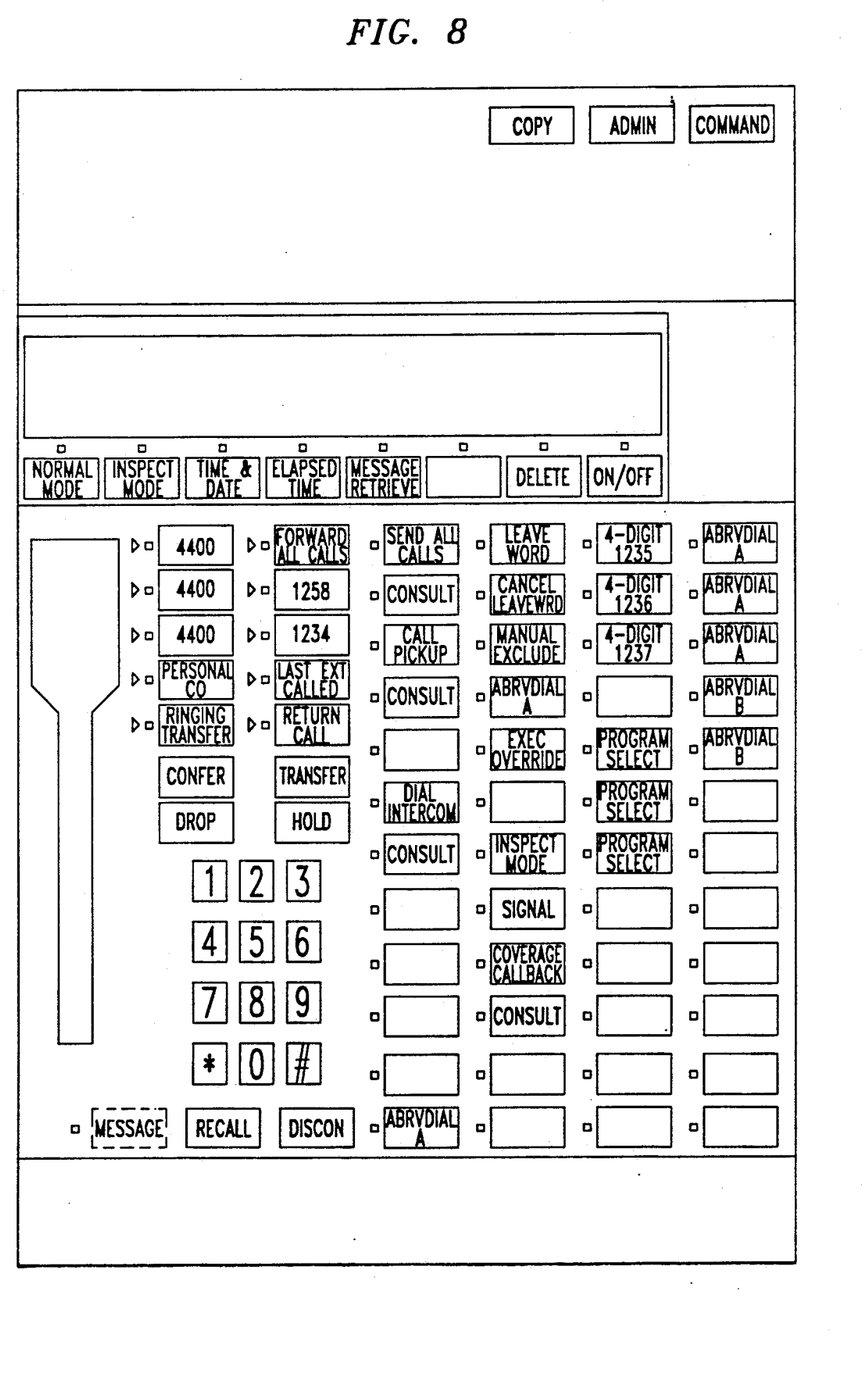

It will be noted that, in FIG. 8, mouse keys 51-53 have been reprogrammed to represent "copy", "admin", and "command" functions, as shown in the upper right-hand corner of FIG. 8. Following step 215, function 31 awaits the administrator's selection of one of these functions, at step 216.

Pressing of "command" mouse key 53 signals selection of the commands menu that was discussed above in conjunction with FIG. 7. Pressing of "admin" mouse key 52 signals a desire to administer the displayed terminal. And pressing of "copy" mouse key 51 signals a desire to copy a feature that is associated with an actuator 50 being pointed to by cursor 24.

Figure 9:
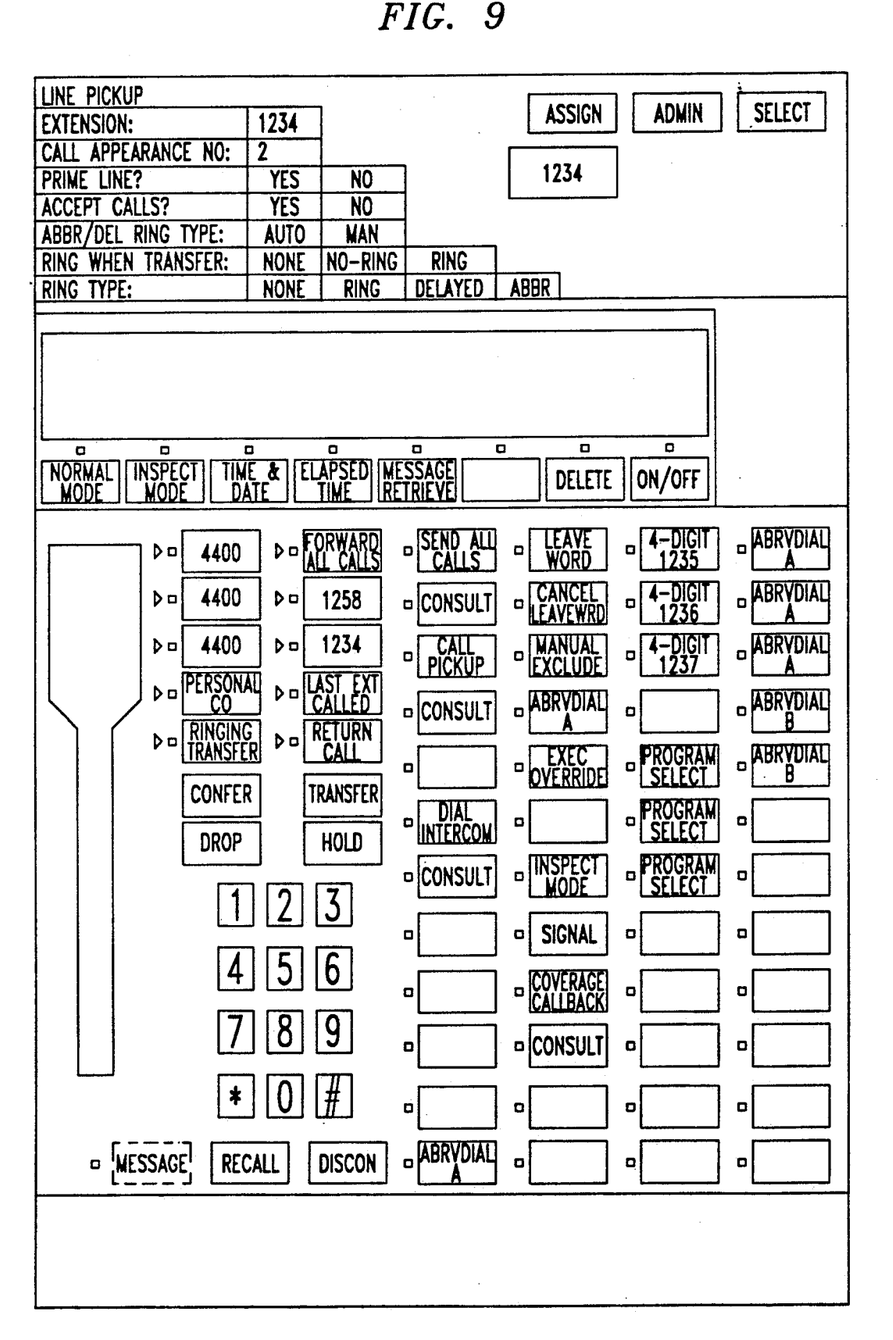

Function 31 receives the administrator's selection, at step 216, and checks if "copy" mouse key 51 was selected, at step 217. If so, function 31 determines whether mouse 23 is pointing to one of the displayed actuators 50, at step 218, i.e., whether cursor 24 has been positioned by the administrator via mouse 23 within the displayed bounds of one of the actuators 50. If not, function 31 returns to step 216 to await a new selection; if so, function 31 copies the feature information assigned to the pointed-to actuator 50 into a computer 30 memory 32 actuator work area, at step 219. If the pointed-to actuator 50 presently has no feature assigned thereto, copying of the feature information results in clearing of the actuator work area contents. (See also "blank" feature, below.) Function 31 also displays the copied feature information, including any attributes thereof, at the top of display 22, at step 229. An illustrative view of display 22 following step 229 is shown in FIG. 9.

Returning to step 217, if "copy" mouse key 53 was not selected, function 31 checks whether "admin" mouse key 52 was selected, at step 221. If so, at step 222, function 31 displays over the top of the present display a feature menu of features available to the class-of-service that was either designated at step 206 or obtained from translations database 40 at step 210. An illustrative view of display 220 following step 222 is shown in FIG. 10.

Function 31 now awaits the administrator's selection of one of the features from the displayed menu, at step 223. The administrator makes a selection by using mouse 23 to point cursor 22 to the desired feature and pressing again "admin" mouse key 52. A menu feature that is presently pointed to by cursor 22 is highlighted in reverse video. Mouse keys 51 and 53 are disabled at this time. Upon receiving the feature selection, at step 223, function 31 deletes display of the feature menu, at step 224, copies information associated with the selected feature, including any attributes thereof, into the computer 30 memory 32 actuator work area, at step 225, and displays the copied information at the top of display 22, at step 229. Presently-assigned attribute values are highlighted in reverse video.

Figure 10:
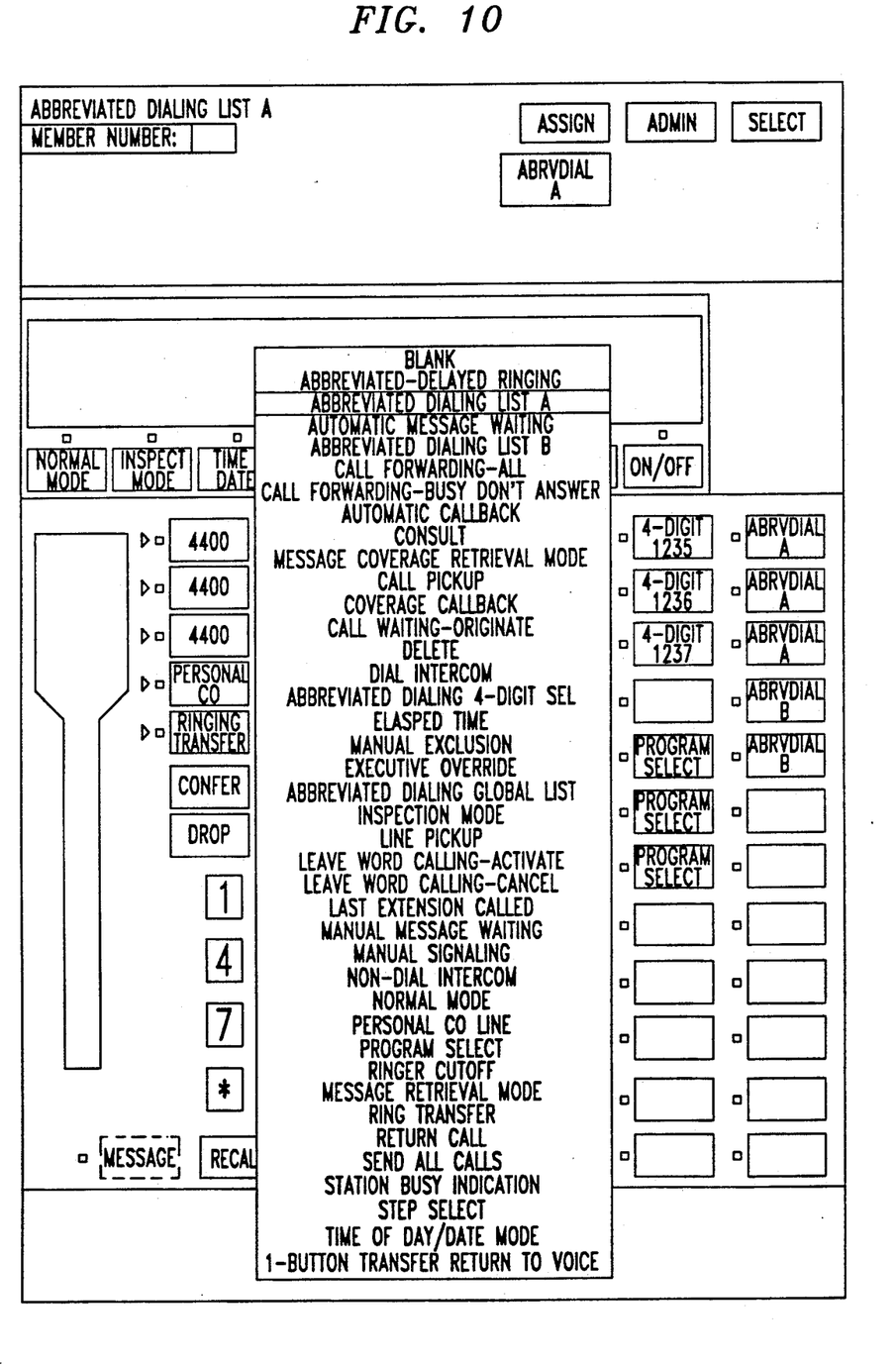

It will be noted in FIG. 10 that one of the selectable features is a "blank" feature. Its selection and assignment to an actuator 50 merely results in deletion, clearing, of any feature previously assigned to that actuator 50.

Following step 229, display 22 is in the state illustratively shown in FIG. 9. It will be noted that in this state, mouse keys 51-53 have been reprogrammed to represent functions "assign", "admin", and "select", respectively, as shown in the upper right-hand corner of FIG. 9. Following step 229, function 31 checks whether or not all attributes associated with the displayed feature have assigned values and whether those values are valid, at step 230. If all attribute values associated with the displayed feature either do not have assigned values, or if any of those values are not valid (e.g., fall outside of an acceptable range of values for that attribute), the feature may not be assigned to an actuator 50. Hence, function 31 proceeds to step 231, wherein it displays a blank retangle for "assign" mouse key 51 to indicate that the "assign" function is presently invalid and inoperative. Function 31 then awaits selection of one of the mouse keys 52 or 53, at step 232. Pressing "admin" mouse key 52 signals a desire to administer the displayed terminal, while pressing "select" key 53 signals a desire to select a feature attribute value pointed to by the mouse. Function 31 receives the administrator's selection, at step 232, and checks if "admin" mouse key 52 was selected, at step 233. If so, function 31 responds thereto as it had at step 221, and proceeds to step 222. If not, function 31 checks if "select" mouse key 53 was selected, at step 234. If not, it means that "assign" mouse key 51 was selected, which key is being ignored at step 232, so function 31 returns to step 232 to await another selection. If "select" key 53 was selected, function 31 determines whether mouse 23 is pointing cursor 24 to one of the feature attribute values, e.g., at the top left-hand corner of FIG. 9, at step 235. If not, function returns to step 232 to await a new selection; if so, function 31 highlights the field that represents the selected, pointed-to, value, at step 236, by displaying that field in reverse video (see FIG. 9). Function 31 then checks, at step 237, whether this value requires numerical entry, e.g., from keyboard 21, or whether it is one of a number of predefined displayed values. If numerical entry is not required, function 31 clears the attribute's value, if any, that is presently stored in the computer 30 memory 32 actuator work area, at step 238, and substitutes therefor the pointed-to, selected, value, at step 239. Function 31 then returns to step 230 to determine if all attributes have entered and valid values.

Figure 11:
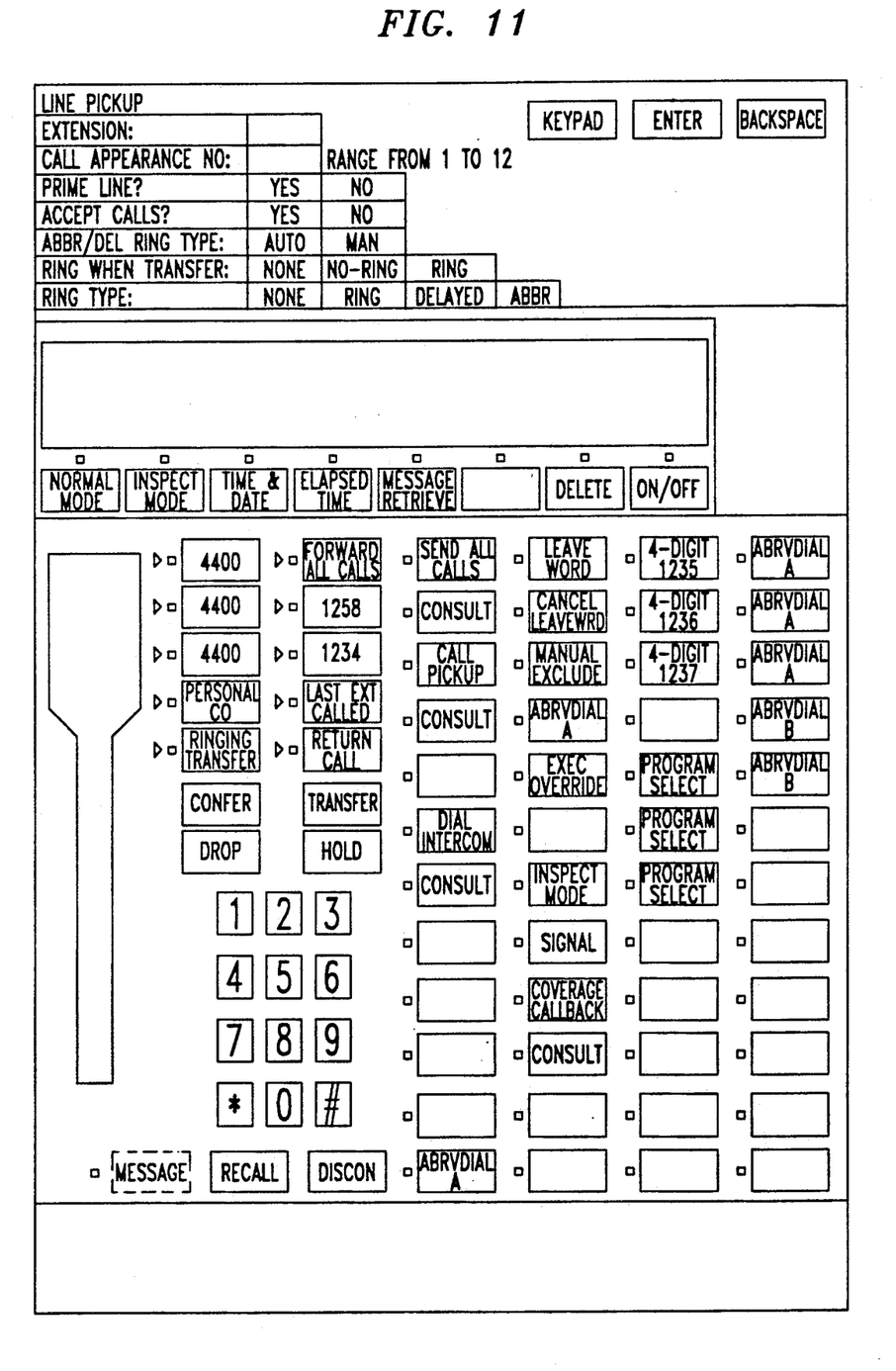

Returning to step 237, if numerical entry is required, function 31 displays the acceptable range for the attribute value next to the attribute value field, at step 245. This is illustratively shown in FIG. 11. It will also be noted that in this state of display 22, mouse keys 51-53 are reprogrammed to represent "keypad", "enter" and "backspace" functions. The purpose is to permit numerical entry of the attribute value by way of mouse 23, as well as from keyboard 21. Keyboard entry is standard: the administrator types in the desired digits and hits the return key. To select numbers via mouse 23, the administrator sequentially positions cursor 24 over each desired digit button of the displayed terminal's keypad and presses "keypad" mouse key 51 each time. To edit selected numbers before their entry, the administrator presses "backspace" mouse key 53 to delete the last-selected digit each time key 53 is pressed. To enter the selected numbers, the administrator presses "enter" mouse key 52.

Following step 245, function 31 awaits the administrator's input—either keyboard 21 input or keypad selection via mouse 23—at step 246. Upon receipt of input, at step 246, function 31 checks whether mouse "keypad" key 51 was pressed, at step 250. If so, function 31 checks whether mouse 23 is pointing cursor 24 to one of the displayed terminal's keypad keys, at step 251. If a keypad key is not being pointed to, function 31 ignores present input and returns to step 246 to await and receive new input. If a keypad key is being pointed to, function 31 enters the numerical value represented by the pointed-to key into a computer 30 memory 32 attribute work area, at step 252. Function 31 then validates the just-entered value against the displayed acceptable value range, at step 253. If the value is valid, function 31 returns to step 246 to await further input; if the value is invalid, function 31 clears the just-entered numerical value from the attribute work area, at step 254, issues an alert, such as a beep, to the administrator, at step 255, and returns to step 246 to await further input.

Returning to step 250, if "keypad" mouse key 51 was not pressed, function 31 checks whether "enter" mouse key 52 was pressed, at step 260. If so, function 31 removes the highlighting from the feature value that had been highlighted at step 236, at step 261, and also deletes the displayed range from display 22, at step 262. Function 31 then returns to step 230 to check if all function attributes now have valid values. If "enter" mouse key 52 is determined to not have been pressed at step 260, function 31 checks whether "backspace" mouse key 53 was pressed, at step 265. If so, function 31 clears the previously-entered (at step 252) numerical value from the attribute work area, at step 266, and returns to step 246 to await further input from the administrator. If "backspace" mouse key 53 is determined to not have been pressed at step 265, it means that the received input is keyboard 21 input, and function 31 checks whether a keyboard 21 numeric key was selected. If so, function 31 proceeds to step 252 to take the same action as for pressing of "keypad" mouse key 51. If not, function 31 checks whether keyboard 21 "enter" key, e.g., carriage return key, was selected, and if so, function 31 proceeds to step 261 to take the same action as for pressing of "enter" mouse key 52. If keyboard 21 "enter" key was not selected, function 31 checks whether keyboard 21 "backspace" key was selected. If so, function 31 proceeds to step 266 to take the same action as for pressing of "backspace" mouse key 53; if not, function 31 ignores the input and returns to step 246 to await further input.

Returning now to step 230, where display 22 is illustratively in the state of FIG. 9, if function 31 determines that all attributes associated with the feature that is being administered have valid values entered, function 31 awaits the administrator's selection of one of mouse keys 51-53, at step 272. Upon receiving the selection, at step 272, function 31 checks whether "admin" mouse key 52 was selected, at step 273. If not, function 31 proceeds to step 233 et seq., described above. If "admin" key 52 was selected, function 31 checks whether mouse 23 is pointing cursor 24 to one of the displayed terminal's actuators 50, at step 274. If not, function 31 ignores the input and returns to step 272 to await the administrator's next action. If cursor 24 is positioned over one of the displayed actuators 50, function 31 copies the feature information stored in computer 30 memory 32 feature work area into the computer 30 memory 32 terminal work area and associates it with the selected actuator 50, at step 275, thereby assigning the feature to that actuator 50. Function 31 then returns to step 216 to await the administrator's next action, and in the process returns display 22 into the state illustratively shown in FIG. 8.

As mentioned previously, at step 216 function 31 awaits selection of one of "copy", "admin", and "command" mouse keys 51-53. The response of function 31 to selection of "copy" key 51 and "admin" key 52 has already been discussed. If it is determined at step 221 that "admin" key 52 has not been selected, it means that "command" key 53 has been selected, and function 31 responds by displaying the command menu over the present display, at step 280, in like manner as shown in FIG. 7. Function 31 then awaits the administrator's selection of one of the commands, at step 281. Upon receiving the selection, at step 281, function 31 deletes the command menu from the display, at step 282, and checks whether the "new phone" command was selected, at step 283. If so, function 31 returns to step 201 et seq. to display all selectable terminal types to the administrator, as shown in FIG. 6. If the "new phone" command was not selected, function 31 checks whether the "save phone" command was selected, at step 284. If not, the "exit" command must have been selected, and function 31 exits, at step 290. But if the "save phone" command was selected, it means that the administrator is done administering the displayed terminal's actuators 50, and function 31 queries the administrator for identification of the location where the administered terminal information should be saved, i.e., to whom or what it should be assigned, at step 285. Illustratively, function 31 issues a prompt to the administrator on display 22 of terminal 20. Function 31 then awaits the administrator's response, at step 286.

The desired response may be the same information as was queried for at step 208: the name or extension number of the user to whom the terminal is to be assigned, or the number of the port of PBX 13 to which the terminal is to be connected. Upon receiving the requisite terminal location identification, at step 286, function 31 copies contents of the computer 30 memory 32 terminal work area and associates the contents with, e.g., appends thereto, the identified location information, at step 287. Function 31 then translates this administered-terminal information into the format used by translations database 40, at step 288, and causes the translated information to be sent to and stored in translations database 40, at step 289. Terminal administration of an individual terminal 15 is thereby completed, and function 31 returns to step 216 to await the administrator's next action.

To generate the pictorial representations of various terminals on display 22, function 31 uses a database of terminal descriptions that are formulated in a graphics description language. The language uses graphics primitives such as those of the AT&T 5620 and 630 (BLIT) terminals. The terminal description first specifies the origin of the terminal's representation, which is an x and a y axis offset from an origin of a virtual display space representing display 22. The description also specifies one or more temporary origins, which are x and y axis offsets from the terminal origin and serve as starting, or reference, coordinates for drawing instructions. The drawing instructions are made up of "move", "line", "circle", "ellipse", "arc", and "spline" primitives, and of actuator objects. A "line" primitive specifies a line to be drawn from any priorly-specified x and y coordinate to an x and y axis offset from that coordinate. The offset is specified as a parameter of the line primitive, and its endpoint location, i.e., the endpoint of the line, serves as the starting coordinate for the immediately-following primitive. A "move" primitive is structured and functions like the "line" primitive, but merely results in cursor relocation without a line being drawn. A "circle" primitive carries as parameters the x and y axis offset of the circle's center from any priorly-specified coordinate, and the circle's radius. An "ellipse" primitive specifies the x and y axis offset of the ellipse's center, plus its x and y radii. An "arc" primitive specifies its endpoint's x and y axis offsets, plus its radius. And a "spline" primitive specifies x and y axis offsets of points along the limit that defines the spline curve. An actuator object carries as parameters the actuator type, the x and y axis offset of its origin, the actuator number as it is assigned within translations database 40, and the text, if any, that labels the actuator. An actuator object is effectively a macro: the specification of each type of actuator is effected via the primitives described above. The specification of an actuator further includes the attributes that are associated with that actuator.

When drawing terminal representations on display 22 of terminal 20, function 31 retrieves the terminal descriptions from the database and passes the descriptions to a translation program that translates the descriptions, in a conventional manner, into the graphics commands used by whatever terminal is the administration terminal, and feeds those commands to the administration terminal.

Of course, it should be understood that various changes and modifications to the illustrative embodiment described above will be apparent to those skilled in the art. For example, the graphics interface can be expanded to include and enhance other system management tasks, such as real-time performance, monitoring, building wire management, building energy management and alarm monitoring, and network administration and maintenance. Also, the interface may be used to administer "soft" keys and other actuators of computer terminals, as well as other equipment. Such changes and modifications can be made without departing from the spirit and the scope of the invention and without diminishing its attendant advantages. It is therefore intended that all such changes and modifications be covered by the following claims.

I claim:

1. An arrangement for assigning telecommunications functions to actuators of a telecommunication terminal having a plurality of the actuators, comprising:
   means for displaying a graphical representation of the terminal including its actuators, and representations of telecommunications functions assignable to the actuators;
   means for selecting individual ones of the displayed representations of the functions and of the actuators;
   means responsive to the selecting means selecting one of (a) a displayed representation of a function and (b) a displayed representation of a first actuator, and further selecting a displayed representation of a second actuator, for assigning one of (a) the function whose representation was selected and (b) a function assigned to the first actuator, to the second actuator; and
   means for preserving the assignment of the function to the second actuator for subsequent use such that the assigned telecommunications function is performed when the second actuator of the terminal whose graphical representation was displayed is actuated.

2. The arrangement of claim 1 wherein
the selecting means comprise
means for pointing to individual ones of the displayed representations of functions and of actuators to select the functions and actuators represented by the pointed-to representations.

3. The arrangement of claim 1 wherein
first ones of the assignable functions each have at least one attribute having a selectable value; and
the assigning means include
means responsive to the selecting means selecting one of (a) a displayed representation of a first function and (b) a displayed representation of a first actuator that is assigned a first function, for causing the displaying means to display the at least one selectable attribute of the one first function, and
means responsive to selection of a value for the at least one attribute of the one first function and to the selecting means selecting the displayed representation of the second actuator, for assigning the one first function including the selected value of the at least one attribute to the second actuator.

4. The arrangement of claim 3 wherein
the assigning means use a single operating command of a type "copy from-modify-replace to" to perform any one of the following operations: "delete" a function from an actuator; "copy" a function to an actuator; "move" a function to an actuator; and "modify" an attribute of a function.

5. The arrangement of claim 1 wherein
the preserving means include
means responsive to designation of one of a plurality of locations for the represented terminal, for effecting storage of the assignment and the designation such that the assigned telecommunications function is performed when the second actuator of the terminal whose graphical representation was displayed and which is located at the designated location is actuated.

6. The arrangement of claim 4 wherein
the assigning means use a single operating command of a type "copy from-replace to" to perform any one of the following operations: "delete" a terminal from a location; "copy" a terminal to a location; "move" a terminal to a location; and "add" a terminal to a location.

7. The arrangement of claim 1 wherein
the means for preserving comprise
means for storing the assignment in a store for controlling the terminal whose graphical representation was displayed.

8. The arrangement of claim 1 wherein
the means for preserving comprise
means for storing the assignment in a database for controlling a telecommunications system comprising the terminal whose graphical representation was displayed.

9. The arrangement of claim 1 wherein
the displaying means include
means for displaying graphical representations of a plurality of different terminals;
the selecting means include
means for selecting individual ones of the displayed representations of the terminals; and
the assigning means include means responsive to the selecting means selecting the displayed graphical representation of one of the terminals for causing the displaying means to display the graphical representation solely of the selected terminal.

10. The arrangement of claim 9 wherein
the displaying means display graphical representations of a plurality of terminals including a representation of a first terminal whose actuators already have assigned telecommunications functions;
the preserving means include
means responsive to the selecting means selecting the representation of the first terminal for effecting retrieval from storage of the assignment of functions to actuators of the first terminal, and
means responsive to designation of one of a plurality of locations for the first terminal, for effecting storage of the designation and assignment of functions to the actuators of the first terminal such that a telecommunications function assigned to an individual actuator of the first terminal is performed when the individual actuator of the first terminal located at the designated location is actuated; and
the assigning means include
means responsive to the retrieval for causing the displaying means to display the graphical representation of solely the first terminal having the actuators labeled with their assigned functions.

11. The arrangement of claim 10 wherein
first ones of the assignable functions each have at least one attribute having a selectable value; and
the assigning means include
means responsive to the selecting means selecting one of (a) a displayed representation of a first function and (b) a displayed representation of a first actuator that is assigned a first function, for causing the displaying means to display the at least one selectable attribute of the one first function, and
means responsive to selection of a value for the at least one attribute of the one first function and to the selecting means selecting the displayed representation of the second actuator, for assigning the one first function including the selected value of the at least one attribute to the second actuator.

12. The arrangement of claim 10 wherein
the assigning means use a single operating command of a type "copy from-modify-replace to" to perform any one of the following operations: "delete" a terminal from a location; "copy" a terminal to a location; "move" a terminal to a location; "add" a terminal to a location; and "modify" features of a terminal assigned to a location.

13. The arrangement of claim 1 wherein
the assigning means use a single operating command of a type "copy from-replace to" to perform any one of the following operations: "delete" a function from an actuator; "copy" a function to an actuator; and "move" a function to an actuator.

14. A method of assigning telecommunications functions to actuators of a telecommunication terminal having a plurality of the actuators, comprising the steps of:
displaying a graphical representation of the terminal including its actuators, and representations of telecommunications functions assignable to the actuators;
selecting one of (a) a displayed representation of a function and (b) a displayed representation of a first actuator;
selecting a displayed representation of a second actuator;
assigning one of (a) the function whose representation was selected and (b) a function assigned to the first actuator, to the second actuator, in response to the selections; and
preserving the assignment of the function to the second actuator for subsequent use such that the assigned telecommunications function is performed when the second actuator of the terminal whose graphical representation was displayed is actuated.

15. The method of claim 14 wherein
the steps of selecting each comprise the step of
pointing via a pointing arrangement to a displayed representation of a function or an actuator to effect selection of the function or the actuator represented by the pointed-to representation.

16. The method of claim 14 for assigning first functions each having at least one attribute having a selectable value, wherein
the first step of selecting comprises the step of
selecting one of (a) a displayed representation of a first function and (b) a displayed representation of a first actuator that is assigned a first function;
the step of displaying comprises the step of
displaying on the display the at least one selectable attribute of the first function, in response to the selection;
the method comprises the further step of
selecting a value for the at least one displayed selectable attribute of the first function; and
the step of assigning comprises the step of
assigning the one first function including the selected value of the at least one attribute to the second actuator.

17. The method of claim 16 wherein
the steps of assigning include using a single operating command of a type "copy from-modify-replace to" to perform any one of the following operations: "deleting" a function from an actuator; "copying" a function to an actuator; "moving" a function to an actuator; and "modifying" an attribute of a function.

18. The method of claim 14 further comprising the step of
designating one of a plurality of locations for the represented terminal; and wherein
the step of preserving comprises the step of
effecting storage of the assignment and the designation such that the assigned telecommunications function is performed when the second actuator of the terminal whose graphical representation was displayed and which is located at the designated location is actuated.

19. The method of claim 18 wherein
the step of assigning includes using a single operating command of a type "copy from-replace to" to perform any one of the following operations: "deleting" a terminal from a location; "copying" a terminal to a location; "moving" a terminal to a location; and "adding" a terminal to a location.

20. The method of claim 14 wherein
the step of displaying comprises the step of
displaying graphical representations of a plurality of terminals;
the first step of selecting comprises the step of
selecting one of the displayed representations, of a selected terminal; and the step of displaying comprises the further step of displaying the graphical representation of solely the selected terminal, in response to the selection.

21. The method of claim 14 wherein
the step of displaying graphical representations of a plurality of terminals comprises the step of
displaying graphical representations of a plurality of terminals including a representation of a first terminal whose actuators already have assigned telecommunications functions;
the step of selecting one of the displayed representations of the terminals comprises the step of
selecting the representation of the first terminal;
the method further comprising the step of
effecting retrieval from storage of the assignment of functions to actuators of the first terminal;
the step of displaying the graphical representation of solely the selected terminal comprises the step of
displaying the graphical representation of solely the selected first terminal having the actuators labeled with their assigned functions, in response to the retrieval;
the method further comprises the step of
designating one of a plurality of locations for the first terminal;
the storage-effecting step comprises the step of
effecting storage of the assignment and the designation such that a telecommunications function assigned to an individual actuator of the first terminal is performed when the individual actuator of the first terminal located at the designated location is actuated.

22. The method of claim 21 for assigning first functions each having at least one attribute having a selectable value, wherein
the first step of selecting comprises the step of
selecting one of (a) a displayed representation of a first function and (b) a displayed representation of a first actuator that is assigned a first function;
the step of displaying comprises the step of
displaying on the display the at least one selectable attribute of the first function, in response to the selection;
the method comprises the further step of
selecting a value for the at least one displayed selectable attribute of the first function; and
the step of assigning comprises the step of
assigning the one first function including the selected value of the at least one attribute to the second actuator.

23. The method of claim 21 wherein
the step of assigning includes using a single operating command of a type "copy from-modify-replace to" to perform any one of the following operations: "deleting" a terminal from a designated location; "copying" a terminal to a designated location; "moving" a terminal to a designated location; "adding" a terminal to a designated location; and "modifying" features of a terminal assigned to a designated location.

24. The method of claim 14 wherein
the step of assigning includes using a single operating command of a type "copy from-replace to" to perform any one of the following operations: "deleting" a function from an actuator; "copying" a function to an actuator; and "moving" a function to an actuator.

25. An arrangement for assigning telecommunications functions to actuators of a telecommunication terminal having a plurality of the actuators, comprising:
means for displaying a graphical representation of the terminal including its actuators, and representations of telecommunications functions assignable to the actuators;
means for selecting individual ones of the displayed representations of the functions and of the actuators;
means responsive to the selecting means selecting one of the displayed representations of functions and one of the displayed representations of actuators, for assigning the function whose representation was selected to the actuator whose representation was selected; and
means for preserving the assignment of the selected function to the selected actuator for subsequent use such that the assigned telecommunications function is performed when the selected actuator of the terminal whose graphical representation was displayed is actuated.

26. A method of assigning telecommunications functions to actuators of a telecommunication terminal having a plurality of the actuators, comprising the steps of:
displaying a graphical representation of the terminal including its actuators, and representations of telecommunications functions assignable to the actuators;
selecting one of the displayed representations of functions;
selecting one of the displayed representations of actuators;
assigning the function whose representation was selected to the actuator whose representation was selected, in response to the selections; and
preserving the assignment of the selected function to the selected actuator for subsequent use such that the assigned telecommunications function is performed when the selected actuator of the terminal whose graphical representation was displayed is actuated.

* * * * *